B. G. BARSHAW & D. F. GETTINGS.
VEHICLE SEMAPHORE.
APPLICATION FILED APR. 20, 1917.
1,267,957.
Patented May 28, 1918.
2 SHEETS—SHEET 1.
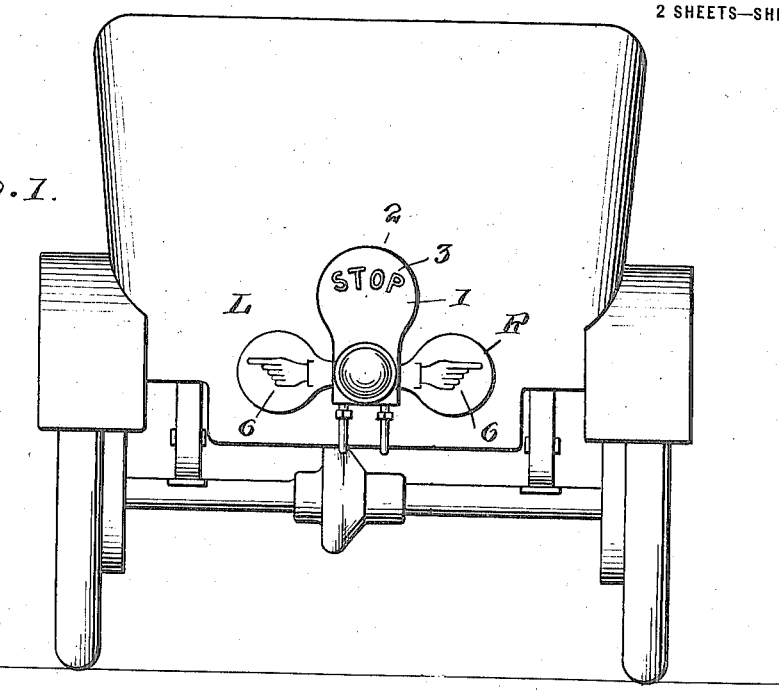
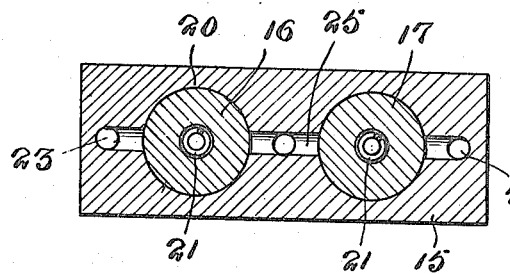
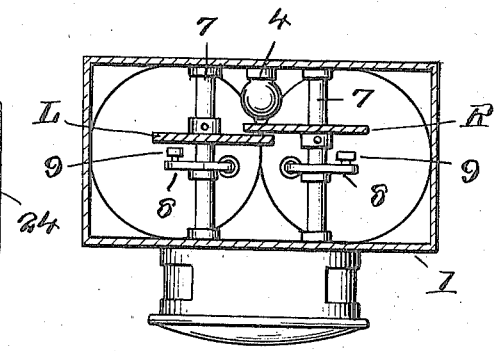
WITNESSES
INVENTORS
B. G. Barshaw
D. F. Gettings
BY Victor J. Evans
ATTORNEY

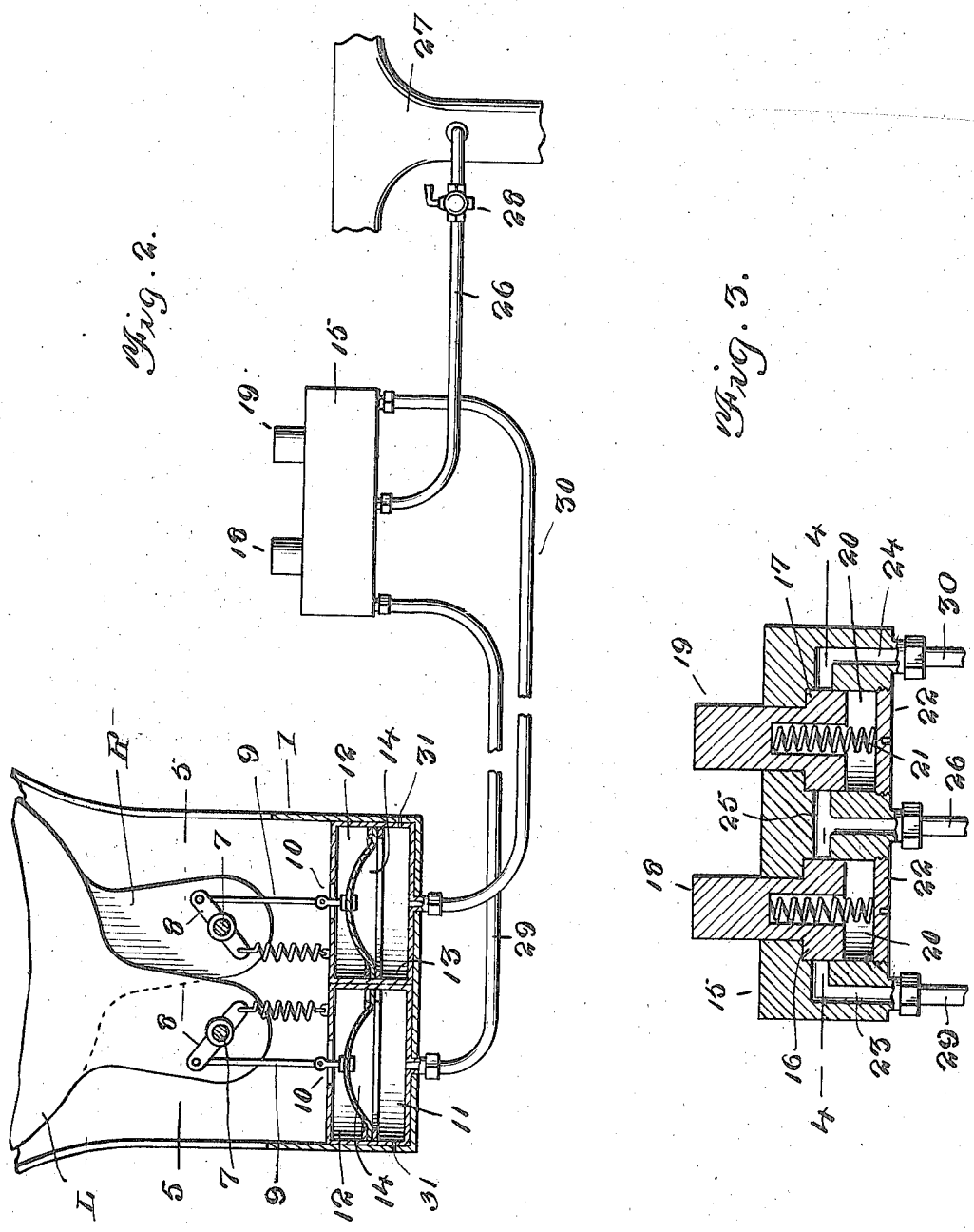

UNITED STATES PATENT OFFICE.

BERTON G. BARSHAW AND DANIEL F. GETTINGS, OF CARTHAGE, NEW YORK.

VEHICLE-SEMAPHORE.

1,267,957.　　　　　Specification of Letters Patent.　　Patented May 28, 1918.

Application filed April 20, 1917. Serial No. 163,467.

*To all whom it may concern:*

Be it known that we, BERTON G. BARSHAW and DANIEL F. GETTINGS, citizens of the United States, residing at Carthage, in the county of Jefferson and State of New York, have invented new and useful Improvements in Vehicle-Semaphores, of which the following is a specification.

This invention relates to vehicle semaphores or signals designed for use especially in connection with motor vehicles, the object in view being to produce a simple and reliable signaling device especially adapted to be mounted upon a motor car at any suitable place for the purpose of advising other vehicles and traffic generally as to whether or not the operator contemplates turning to the right or to the left or bringing his vehicle to a stop.

A further object in view is to provide in connection with a vehicle semaphore or signal comprising a casing or housing, and a pair of signaling members normally housed therein but adapted to be projected therefrom, novel operating mechanism whereby either of said signaling members may be displayed independently of the other and whereby also both of said signaling members may be simultaneously displayed.

A still further object of the invention is to provide an additional signal which is exposed only when bodies of the signaling members above referred to are simultaneously moved to their projecting or signaling positions.

With the above and other objects in view, the invention consists in the novel construction, combination and arrangement of parts, as herein described, illustrated and claimed.

In the accompanying drawing:—

Figure 1 is a view in elevation, showing the signal or semaphore applied to a motor vehicle.

Fig. 2 is a general diagrammatic view of the complete apparatus.

Fig. 3 is an enlarged sectional view of the valve mechanism.

Fig. 4 is a section on the line 4—4 of Fig. 3.

Fig. 5 is a section on the line 5—5 of Fig. 2.

The signaling device or semaphore contemplated in this invention embodies a casing or housing 1 the face wall 2 of which is stenciled or perforated as indicated at 3, the stenciling taking the form of a symbol or word such as "Stop" so that the rays of light from a lamp contained in the casing or housing may be transmitted therethrough, forming a part of the signaling apparatus. A lamp 4 such as an electric bulb is arranged within the casing and behind a pair of semaphores R and L. In other words the semaphores R and L are interposed between the lamp 4 and a lens or panel 5 so that when one or both of the semaphores are contained in the casing or housing, they prevent the transmission of rays of light through the stenciling 3. When however both of said semaphores are projected from the casing, the rays of light are no longer intercepted and the word "Stop" or an equivalent word or symbol is displayed. Each of the semaphores R and L has represented on its signaling face, a directional symbol 6 such as a hand, arrow or cautionary word.

The means for operating the semaphores will now be described. Each semaphore is fast upon a shaft 7 and extending from said shaft is a semaphore operating arm 8 having pivotally connected thereto a rod 9 which extends through an opening 10 in the top wall of a box-like chamber 11, the latter being divided into two suction compartments 12 by means of a partition 13. Each of the rods 9 is connected to a separate flexible diaphragm 14 contained within the respective suction or vacuum chamber 12.

15 designates a valve casing containing two valves 16 and 17 each having an operating extension 18 or 19 forming a push button the end of which projects beyond the end of the casing 15. Each valve is of greater diameter than the button or operating extension thereof and works in a valve chamber 20 in the casing 15. Each valve is yieldingly held in its closed position by a spring 21 in turn supported by a plug 22 which is threaded into the casing 15 and closes one end of the respective valve chamber as clearly shown in Fig. 3. An air passage 23 leads to one valve chamber 20 and another air passage 24 leads to the other valve chamber 20. A T-shaped passage 25 leads from one valve chamber to the other and communicates with a suction pipe 26 which leads to the suction connection 27 or intake pipe or manifold of the engine, the pipe 26 being controlled by a stop cock 28. A conduit 29 leads from one of the suction chambers 11 to the passage 23, and another conduit or pipe 30 leads from the other suction chamber 12 to the passage 24. The valve casing may be located at any convenient point in a motor vehicle where it is readily accessible to the operator and it is preferred to arrange the push buttons and connections in such a way that when the operator pushes on the right hand button, the right hand signal will be operated to show that a right hand turn is contemplated, and when he presses on the left hand button, the left turn indicating signal will be operated. When either one of the valves is pushed to an open position, the suction in the connection 27 is transmitted through the pipe 25 and past the open valve through the respective conduit 29 or 30 to the appropriate suction chamber 12, thereby pulling downwardly on the diaphragm 14 in that suction chamber and through the mechanical connections described, rocking the respective signaling member or semaphore to a projecting or signaling position. Each suction chamber 12 may be pierced by a small air vent 31 which will allow the diaphragm 14 to return to its normal position after the valve controlling said diaphragm is released and returned to its closed position by the action of the respective valve closing spring 21. In the day time or at other times when the signaling device is not needed, the stop cock 28 may be closed.

When either or both of the signaling members R and L are in their concealed positions, they prevent the transmission of light through the stenciling 3, but when both of said signaling members are moved to signaling position, the stenciled word or symbol is illuminated.

I claim:—

1. In a traffic signal, the combination with an internal combustion engine of a movable signaling member, means behind which said signaling member is normally concealed, and means operable by the suction of the engine for actuating said signaling member.

2. In a traffic signal, the combination with an internal combustion engine of a movable signaling member, means behind which said signaling member is normally concealed, means operable by the suction of the engine for actuating said signaling member, and a manually controlled valve in turn controlling said suction means.

3. In a traffic signal, the combination with an internal combustion engine of a movable signaling member, means behind which said signaling member is normally concealed, means operable by the suction of the engine for actuating said signaling member, said concealing means having a stenciled cautionary symbol, and a source of light arranged behind said concealing means and also behind said signaling member when in its concealed position.

4. In a traffic signal, the combination with an internal combustion engine of a casing, a movable signaling member normally concealed in said casing, a suction chamber, a diaphragm in said suction chamber operatively connected with said signaling member, a suction conduit extending between said suction chamber and the suction connection of said engine, and manually operable means controlling said suction conduit.

5. In a traffic signal, the combination with an internal combustion engine of a casing, a plurality of movable signaling members normally concealed therein, a plurality of suction chambers, diaphragms in said suction chambers operatively connected with said signaling members, a valve casing, a suction conduit extending from said valve casing to the suction connection of said engine, other conduits extending from said valve casing to said suction chambers, and a plurality of manually operable suction controlling valves each adapted to open up communication between said suction conduit and the respective suction chamber.

6. In a traffic signal, the combination with an internal combustion engine of a casing, a plurality of movable signaling members normally concealed therein, a plurality of suction chambers, diaphragms in said suction chambers operatively connected with said signaling members, a valve casing, a suction conduit extending from said valve casing to the suction connection of said engine, other conduits extending from said valve casing to said suction chambers, and a plurality of manually operable suction controlling valves each adapted to open up communication between said suction conduit and the respective suction chamber, said valves being held normally and yieldingly closed.

In testimony whereof we affix our signatures.

BERTON G. BARSHAW.
DANIEL F. GETTINGS.